June 17, 1924.

B. W. PHILPOT 1,497,733

BINDER FOR AUTOMOBILE SPRINGS

Filed Aug. 15, 1923

Inventor:
Berry W. Philpot
by Macleod, Calne Copeland & Dike
Attorneys.

Patented June 17, 1924.

1,497,733

UNITED STATES PATENT OFFICE.

BERRY W. PHILPOT, OF MELROSE, MASSACHUSETTS.

BINDER FOR AUTOMOBILE SPRINGS.

Application filed August 15, 1923. Serial No. 657,639.

*To all whom it may concern:*

Be it known that I, BERRY W. PHILPOT, a citizen of the United States, residing at Melrose, county of Middlesex, Commonwealth of Massachusetts, have invented a certain new and useful Improvement in Binders for Automobile Springs, of which the following is a specification, reference being had therein to the accompanying drawings.

The invention relates to a new and useful improvement in binders for automobile springs. It is very desirable to have the automobile springs covered with a protector to prevent the gathering of dirt or grit in the spring or the mixing of dirt with the lubricant and to prevent the lubricant from escaping. The object of my invention is to provide a binder which can be readily wrapped around an automobile spring and secured thereto and so constructed as to prevent the escape of the lubricant and to prevent the intake of dust and grit.

The invention will be fully understood from the following description when taken in connection with the accompanying drawings, and the novel features thereof will be pointed out and clearly defined in the claims at the close of this specification.

Figure 1:
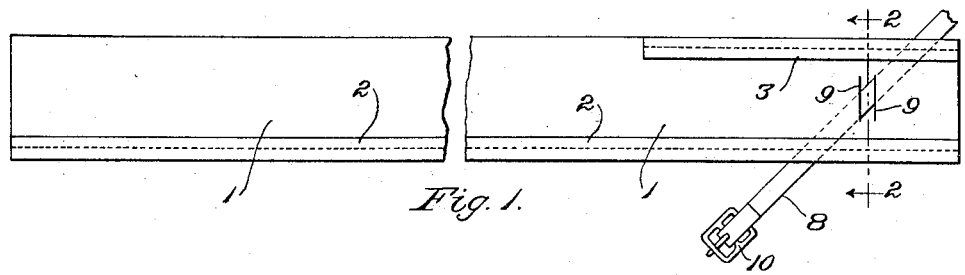
Fig. 1 is a bottom plan view of a binder embodying the invention.
Figure 2:
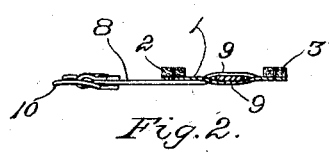
Fig. 2 is a section on line 2, 2, Fig. 1.
Figure 3:
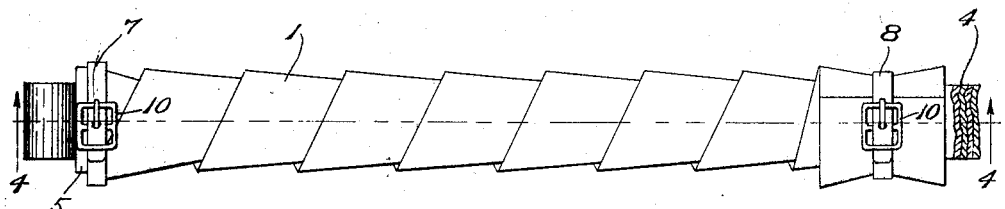
Fig. 3 is a plan view showing a portion of an automobile spring with a binder embodying the invention wound around the same.

Referring now to the drawings:

There is shown at 1 a strip or band of flexible material which forms the body of the binder. For cheapness consistent with durability, and ability to perform its function, I prefer to use imitation leather, although any suitable material may be employed. As the band is to be wound in spiral fashion around the spring, it is made of considerably greater length than width. I find a satisfactory size to be about three inches wide and nine feet or more in length depending upon the size and length of the spring, but the length and width may be varied as desired.

Figure 4:
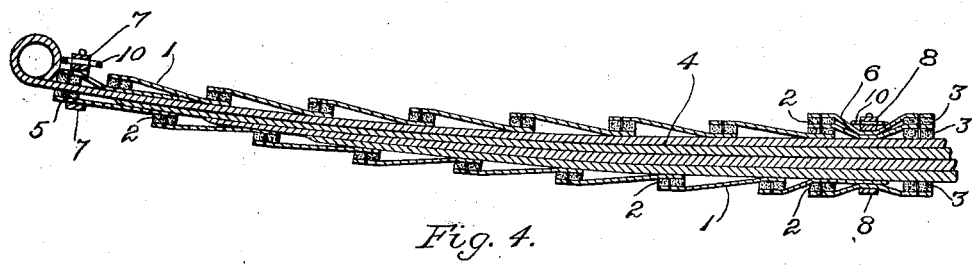
Fig. 4 is a longitudinal section of the spring and the binder shown on line 4—4 of Fig. 3.

Each winding of the band should overlap for some distance the preceding winding so as to leave no open joints and as a further protection against the escape of lubricant, I provide a sort of dam or pad on the inner face along the edge thereof. For this purpose, there is secured to the inner face of the band along one edge, a relatively narrow strip 2 of felt or other soft fibrous material which extends the entire length of the band. A narrow strip 3 of similar material is secured to the inner face of the band adjacent the other edge and extends from the outer end of the band, that is, from the end which is last wrapped around the spring for some distance lengthwise of the band toward the opposite end. It may run the entire length of the band if desired, but for practical purposes it need extend only for a portion of the length and for the purpose to be hereinafter described. An automobile spring is shown at 4 and, as usual, is made up of several leaves. The band is wrapped spirally around the spring 4 beginning at one end of the spring, the beginning of the winding being with that end of the band opposite the end to which the short pad strip 3 is attached. The first winding 5 should be straight around the spring without being spiral and should have the strip of felt on that edge of the band which is at the edge of the spring, so that the first winding of the felt strip will extend to the end of the spring entirely around the spring as shown in Fig. 4.

After the first winding, the band may then begin the spiral arrangement although preferably the second winding should overlap a little more than is required for the subsequent windings, in order to make sure of having a good hold and a firm grip of the band on the spring. The spiral winding is continued until the other end of the spring is reached when the last winding 6 should be straight around the spring like the first winding. At that point the felt strip 3 will entirely encircle the spring, close to the end of the spring. In this way, there will be a complete encircling portion of felt at each end of the spring and spiral windings of the felt, over the intermediate portions of the spring at all the joints. These felt strips will be somewhat compressed by the tight winding of the band and will close the joints between the different windings much better than if these edge strips or dams were made of hard material. The said strips serve to prevent any escape of grease or other lubricant on the springs and also serve as protectors to prevent the intake of dust or dirt in any form. It is important to have both of the side strips 2 and 3 in order to make the binder efficient.

After the binder has been entirely wound around the spring for its full length, it should be fastened at each end to prevent the binder from unwinding. Preferably a strap is used for this purpose. An ordinary short, buckle strap 7 is shown as secured around the bound spring near that end which is first bound and may be entirely separate from the band if so preferred.

To secure the band at the end last wound, I prefer to have a strap 8 attached to the band beforehand so as to have it in readiness and convenient for immediate strapping around the band as soon as the winding is completed. In the preferred method of attachment, I form in the band a short distance back from its outer end two transverse parallel slits 9, 9 and the strap 8 is passed under the loop 9 formed by the slits, the buckle 10 on the strap preventing it from being pulled through the loop. The strap is then always in position to be conveniently reached for encircling the last winding of the band. By reason of its connection with the loop there is no danger of the strap slipping off from the binding at the end after it is buckled.

What I claim is:

1. A binder for a vehicle spring consisting of a band of flexible material having relatively narrow strips of yielding material secured to its inner face lengthwise thereof adjacent its two opposite side edges, one of said strips extending the full length of the band, the other strip extending from the outer end toward the opposite end for a distance to encircle the spring at least once when the band is wound around the spring.

2. A binder for a vehicle spring consisting of a band of flexible material having relatively narrow strips of yielding material secured to its inner face lengthwise thereof adjacent its two opposite side edges, one of said strips extending the full length of the band, the other strip extending from the outer end toward the opposite end for a distance to encircle the spring at least once when the band is wound around the spring, and a fastening strap attached to the said band near its outer end in such manner and of such length as to enable it to be strapped transversely around the periphery of the bound spring.

3. A binder for a vehicle spring consisting of a band of flexible material having relatively narrow strips of fibrous material secured to its inner face lengthwise thereof adjacent its two opposite side edges, one of said strips extending the full length of the band, the other strip extending from the outer end toward the opposite end for a distance to encircle the spring at least once when the band is wound around the spring.

4. In combination with a vehicle spring, a binder therefor consisting of a band of flexible material wound around the spring from one end to the other, the windings at the two ends being straight around the spring so that the two outer windings extend to the end of the spring, the intermediate windings being in spiral arrangement with the outer edges of the windings lapping onto the preceding winding to form a closed joint, said band being provided with relatively narrow strips of yielding material on its inner face adjacent its two opposite side edges, both of said strips extending from one end of the band toward the opposite end thereof, at least one of said strips extending the full length of the band, the band being wound in such manner that the said yielding strips form pads between the overlapping layers at the joints between the spirals and at the two ends.

5. In combination with a vehicle spring, a binder therefor consisting of a band of flexible material wound around the spring from one end to the other, the windings at the two ends being straight around the spring so that the two outer windings extend to the end of the spring, the intermediate windings being in spiral arrangement, the outer edges of the windings lapping onto the next preceding winding to form a closed joint, said band being provided with relatively narrow strips of yielding material on its inner face adjacent its two opposite side edges, both of said strips extending from one end of the band toward the opposite end thereof, at least one of said strips extending the full length of the band, the band being wound in such manner that the said yielding strips form dams between the overlapping layers at the joints between the spirals and at the two ends, and fastening straps which clamp the binder to the spring at the two ends thereof.

In testimony whereof I affix my signature.

BERRY W. PHILPOT.